US012627571B2

(12) United States Patent
Kote et al.

(10) Patent No.: US 12,627,571 B2
(45) Date of Patent: May 12, 2026

(54) TELECOMMUNICATIONS INFRASTRUCTURE DEVICE CLUSTER MANAGEMENT USING MACHINE LEARNING

(71) Applicant: Dell Products L.P., Round Rock, TX (US)

(72) Inventors: Nithish Kote, Bangalore (IN); Sajit Siddalingappa Manvi, Bengaluru (IN); Nitin Khatkar, New Delhi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,480

(22) Filed: Jan. 24, 2024

(65) Prior Publication Data

US 2025/0240219 A1     Jul. 24, 2025

(51) Int. Cl.
*G06F 15/173* (2006.01)
*H04L 41/0893* (2022.01)
*H04L 41/16* (2022.01)

(52) U.S. Cl.
CPC .......... *H04L 41/16* (2013.01); *H04L 41/0893* (2013.01)

(58) Field of Classification Search
CPC ............................ H04L 41/16; H04L 41/0893
See application file for complete search history.

(56) References Cited

U.S. PATENT DOCUMENTS

| | | | |
|---|---|---|---|
| 2021/0297442 A1* | 9/2021 | Vasseur | H04L 63/1441 |
| 2023/0354045 A1* | 11/2023 | Kumar | H04W 24/02 |
| 2023/0409876 A1* | 12/2023 | Agrawal | G06N 3/045 |
| 2024/0345874 A1* | 10/2024 | Ouyang | G06F 9/5027 |
| 2025/0130919 A1* | 4/2025 | Han | G06F 11/3495 |

OTHER PUBLICATIONS

Wikipedia, "Elbow Method (clustering)," https://en.wikipedia.org/w/index.php?title=Elbow_method_(clustering)&oldid=1140943172, Feb. 22, 2023, 2 pages.
U.S. Appl. No. 18/242,219 filed in the name of Nithish Kote et al. filed Sep. 5, 2023, and entitled "Telecommunications Infrastructure Device Management Using Machine Learning."

* cited by examiner

*Primary Examiner* — Joseph R Maniwang
(74) *Attorney, Agent, or Firm* — Ryan, Mason & Lewis, LLP

(57) ABSTRACT

A method comprises receiving telecommunications infrastructure data corresponding to a plurality of devices, and determining a number of a plurality of clusters comprising respective subsets of the plurality of devices. The determination is based on at least a portion of the telecommunications infrastructure data and is performed using at least one machine learning algorithm. The plurality of clusters are identified and performance of respective ones of the plurality of clusters is predicted using the at least one machine learning algorithm. The method further comprises generating a report including the predicted performance of the respective ones of the plurality of clusters and causing transmission of the report to one or more user devices.

20 Claims, 11 Drawing Sheets

300

500

```
# Selecting the columns from the pool of fields available in the raw data
x = df.iloc[:, [10, 13, 14, 15, 16, 17, 18, 19]].values sarimax_df = df
sarimax_df['Month'] = pd.to_numeric(df['Month'], errors='coerce')

x = df.iloc[:, [8, 10, 13, 14, 15, 16, 17, 18, 19]].values
endog_col = 0  # Index of the column we want to use as the endogenous variable
exog_cols = [10, 13, 14, 15, 16, 17, 18, 19]  # Indices of the exogenous variables

# Selecting the endogenous and exogenous variables from the DataFrame
endog = df.iloc[:, endog_col].values
exog = df.iloc[:, exog_cols].values print(df.isnull().sum())

Fitting the SARIMAX model
order = (7, 0, 1)  # Order of the ARIMA component of the SARIMAX model
model = sm.tsa.SARIMAX(endog, order=order, exog=exog)
model_fit = model.fit()

print(model_fit.summary())
```

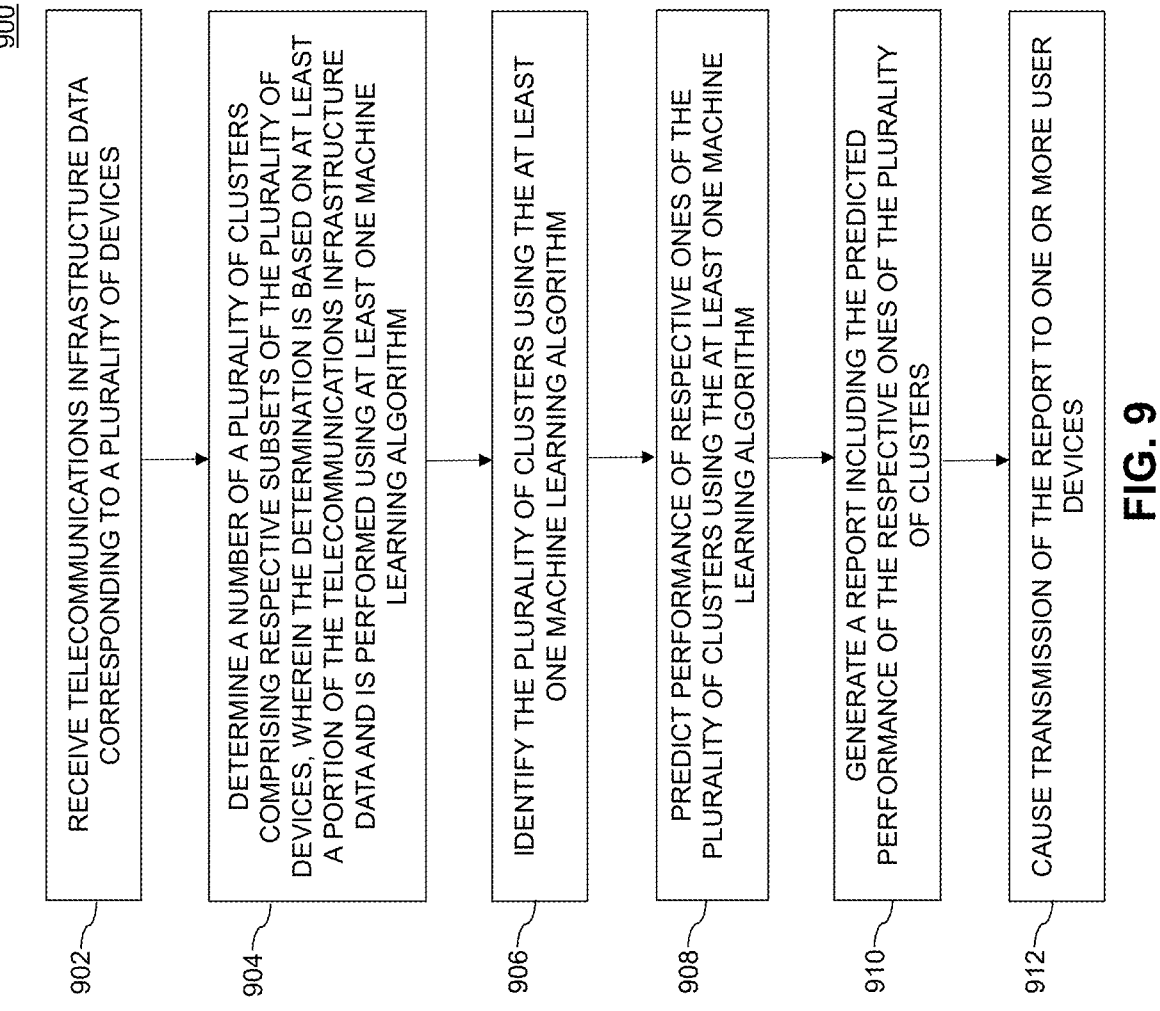

900

902 RECEIVE TELECOMMUNICATIONS INFRASTRUCTURE DATA CORRESPONDING TO A PLURALITY OF DEVICES

904 DETERMINE A NUMBER OF A PLURALITY OF CLUSTERS COMPRISING RESPECTIVE SUBSETS OF THE PLURALITY OF DEVICES, WHEREIN THE DETERMINATION IS BASED ON AT LEAST A PORTION OF THE TELECOMMUNICATIONS INFRASTRUCTURE DATA AND IS PERFORMED USING AT LEAST ONE MACHINE LEARNING ALGORITHM

906 IDENTIFY THE PLURALITY OF CLUSTERS USING THE AT LEAST ONE MACHINE LEARNING ALGORITHM

908 PREDICT PERFORMANCE OF RESPECTIVE ONES OF THE PLURALITY OF CLUSTERS USING THE AT LEAST ONE MACHINE LEARNING ALGORITHM

910 GENERATE A REPORT INCLUDING THE PREDICTED PERFORMANCE OF THE RESPECTIVE ONES OF THE PLURALITY OF CLUSTERS

912 CAUSE TRANSMISSION OF THE REPORT TO ONE OR MORE USER DEVICES

FIG. 9

TELECOMMUNICATIONS INFRASTRUCTURE DEVICE CLUSTER MANAGEMENT USING MACHINE LEARNING

COPYRIGHT NOTICE

FIELD

The field relates generally to information processing systems, and more particularly to management of telecommunications infrastructure device clusters.

BACKGROUND

Telecommunications stations (e.g., multi-cloud telecommunications stations) include various devices such as, for example, network switches and servers. In an area where there is a high concentration of telecommunications network users, such telecommunications stations can put high stress on the components that serve the telecommunications stations. In an effort to alleviate this stress, several servers may be connected to form a pool in a network. Current approaches are not able to identify circumstances under which clusters of servers can be formed.

SUMMARY

Illustrative embodiments provide techniques for automated management of telecommunications infrastructure device clusters.

In one embodiment, a method comprises receiving telecommunications infrastructure data corresponding to a plurality of devices, and determining a number of a plurality of clusters comprising respective subsets of the plurality of devices. The determination is based on at least a portion of the telecommunications infrastructure data and is performed using at least one machine learning algorithm. The plurality of clusters are identified and performance of respective ones of the plurality of clusters is predicted using the at least one machine learning algorithm. The method further comprises generating a report including the predicted performance of the respective ones of the plurality of clusters and causing transmission of the report to one or more user devices.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts example pseudocode for forecasting server utilization based on a number of user requests a base band processing unit (BBU) can process, according to an illustrative embodiment.

FIG. 9 depicts a process for managing telecommunications infrastructure device clusters, according to an illustrative embodiment.

DETAILED DESCRIPTION

Figure 1:
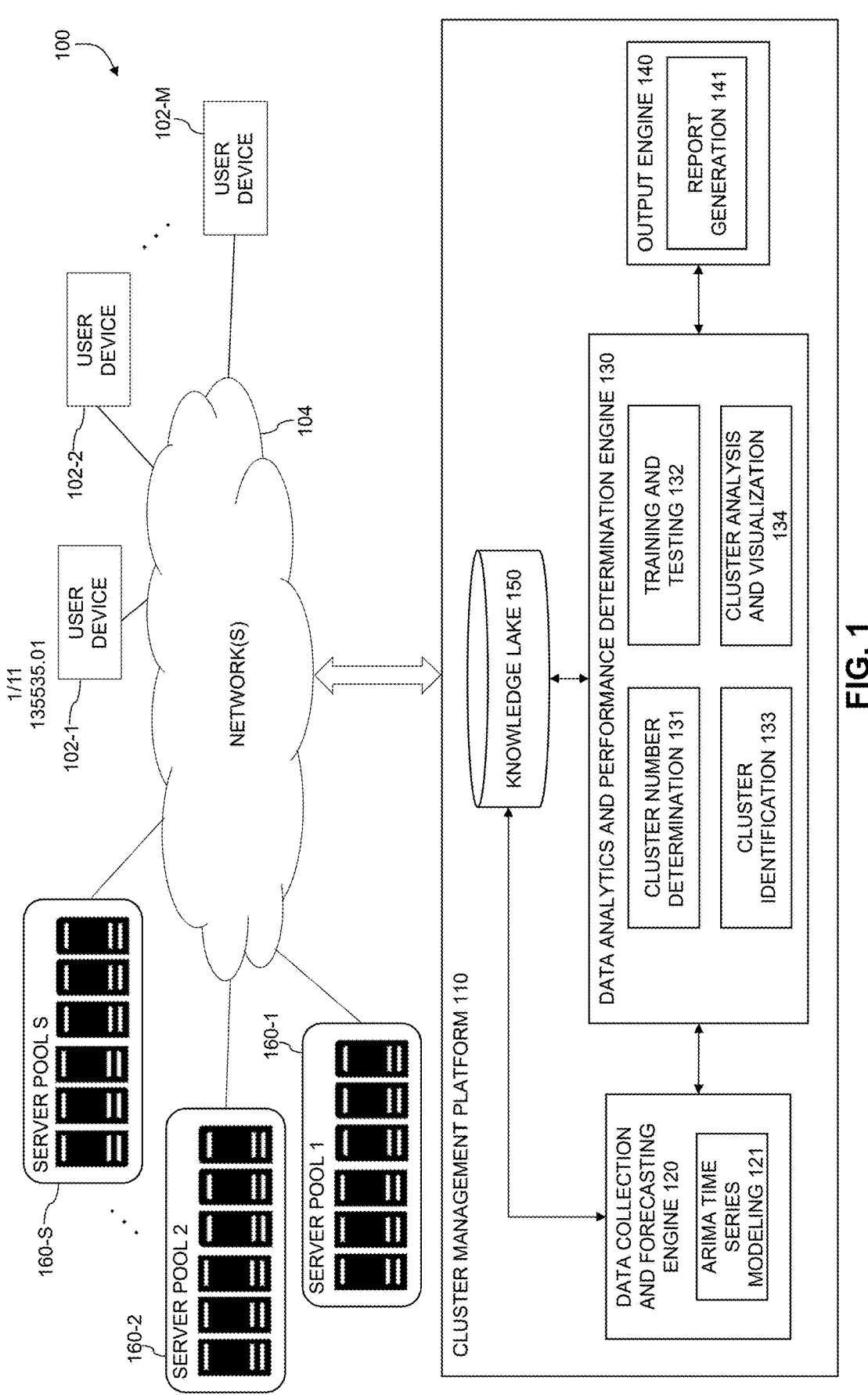
FIG. 1 depicts details of an information processing system with a cluster management platform for managing telecommunications infrastructure device clusters, according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "computing device" refers to a device configured to provide functionality (e.g., applications, tasks, workloads and services) for programs or other devices. A non-limiting example of a computing device is a server. Computing devices provide various functionalities for clients or users, including, but not necessarily limited to, cataloging network data, processing network traffic, signal processing, storing data, implementing communications, performing computations, sharing files, providing streaming services and providing virtualization services. The computing devices can include one or more virtual machines (VMs).

In illustrative embodiments, machine learning techniques are used to intelligently manage a plurality of computing devices (also referred to herein as "devices") of a telecommunications infrastructure by forming and managing clusters of such devices. The embodiments provide an automated framework for dynamically analyzing telecommunications infrastructures and forming clusters of devices in the telecommunications infrastructures based on similar data usage patterns and characteristics of a network and its users and/or problems that may arise from the similar data usage patterns and characteristics. The embodiments recommend cluster configurations and/or analyze performance of cluster configurations based on real-time infrastructure metrics. Advantageously, the illustrative embodiments provide techniques for identifying similar network and user data usage patterns associated with baseband processing unit (BBU) servers in a pool of BBU servers, and for identifying varying levels of cluster performance based on the identified patterns. Advantageously, the embodiments further provide techniques to alert telecommunications administrators with details and insights regarding cluster performance.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a cluster management platform 110.

The user devices 102 can comprise, for example, Internet of Things (IoT) devices, desktop, laptop or tablet computers, mobile telephones, or other types of processing devices capable of communicating with the cluster management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, N, P and S are assumed to be arbitrary positive integers greater than or equal to one.

The terms "client" or "user" herein are intended to be broadly construed so as to encompass numerous arrangements of human, hardware, software or firmware entities, as well as combinations of such entities. Cluster management services may be provided for users utilizing one or more machine learning models, although it is to be appreciated that other types of infrastructure arrangements could be used. At least a portion of the available services and functionalities provided by the cluster management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the cluster management platform 110, as well as to support communication between the cluster management platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the cluster management platform 110.

The information processing system 100 further includes server pools 160-1, 160-2, . . . , 160-S (collectively "server pools 160") connected to the cluster management platform 110 and/or to each other via the network 104 or other type of connection such as, for example, a wired connection. Although the embodiments are explained in terms of server pools 160, and more specifically, BBU server pools or groups, the embodiments are not necessarily limited thereto, and may apply to other types of devices such as, but not necessarily limited to, controllers, switches, etc.

The cluster management platform 110 in the present embodiment is assumed to be accessible to the user devices 102 and vice versa over the network 104. In addition, the cluster management platform 110 can access the server pools 160 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cluster management platform 110, on behalf of respective infrastructure tenants each corresponding to one or more users associated with respective ones of the user devices 102 provides a platform for automating the management of device clusters (e.g., server clusters).

Referring to FIG. 1, the cluster management platform 110 comprises a data collection and forecasting engine 120, a data analytics and performance determination engine 130, an output engine 140 and a knowledge lake 150. The data analytics and performance determination engine 130 comprises a cluster number determination layer 131, a training and testing layer 132, a cluster identification layer 133 and a cluster analysis and visualization layer 134. The output engine 140 comprises a report generation layer 141.

The data collection and forecasting engine 120 collects telecommunications infrastructure data including data corresponding to the operation, performance and/or configuration of servers in the server pools 160. As noted herein above, the server pools 160 may comprise pools of BBU servers. As used herein, a "baseband processing unit" or BBU refers to, for example, a device of a telecommunications network that processes baseband signals. As described in more detail herein, a radio access network (RAN) includes a BBU connected to one or more remote radio units (RRUs) (also referred to herein as remote radio heads (RRHs)). The RRUs (or RRHs) are adjacent to antenna(s). A BBU may communicate with a core network through a physical interface, and an RRU performs transmit and receive radio frequency (RF) functions.

Figure 2:
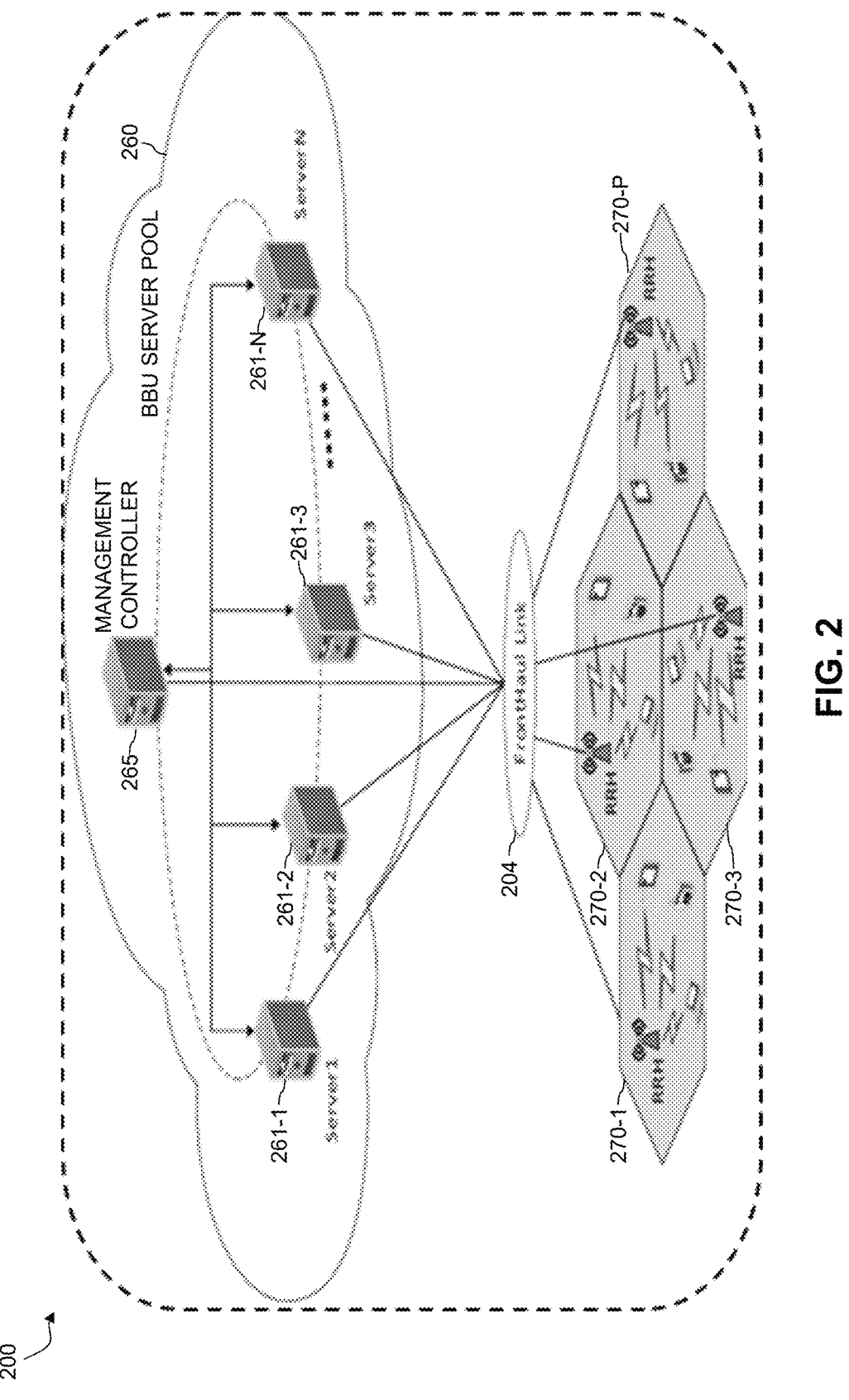
FIG. 2 depicts a cloud radio access network (C-RAN) network, according to an illustrative embodiment.

FIG. 2 illustrates an example of a C-RAN network 200 comprising a BBU server pool 260 (which may be the same or similar to one of the server pools 160) including a plurality of servers 261-1, 261-2, 261-3, ... 261-N (collectively "servers 261"), which can respectively function as a BBU. The servers 261 are controlled by a management controller 265 and are connected to a plurality of RRHs 270-1, 270-2, 270-3, 270-P (collectively "RRHs 270") through a fronthaul link 204. A cloud radio access network (C-RAN) network includes a BBU, one or more RRHs (or RRUs), and fronthaul link, which is a transport network. Fronthaul link 204 as shown in FIG. 2 is a connection layer between a BBU server pool 260 and a set of RRHs 270. The fronthaul link 204 provides high-bandwidth links to handle the requirements of multiple RRHs.

In the area where network user concentration is high, such high stress is placed on BBUs that serve the users. As a result, several servers may be connected to form a BBU server pool (e.g., BBU server pool 260) in a C-RAN. Servers 261 in the BBU server pool 260 have high computational power and storage capabilities. A BBU is located at a designated radius based on, for example, user population, usage requirements and geography. Each BBU is placed across a certain radius/kilometer which is part of the CRAN. As population, usage and/or geography changes, additional BBUs and/or BBU servers may be needed.

Referring to back to FIG. 1, the telecommunications infrastructure data collected by the data collection and forecasting engine 120 comprises, for example, vendor information for at least one telecommunications network (e.g., identifying information for a telecommunications network vendor such as a name of the vendor), a number of users of the telecommunications network, a service radius of the telecommunications network, BBU identifiers (e.g., unique identifiers, names, etc.), one or more protocols of the telecommunications network, one or more types of the telecommunications network (e.g., C-RAN, virtual radio access network (V-RAN), open radio access network (O-RAN)), operating system (OS) information for the devices (e.g., file system host OS for the servers in the server pools 160 or servers 261), Internet Protocol (IP) addresses for the devices, disk information for the devices (e.g., universally unique identifiers (UUIDs) for disks of the servers in the server pools 160 or servers 261) and a time period to which the data corresponds (e.g., year, month, day, time of day, etc.). The telecommunications infrastructure data further comprises one or more performance parameters of the devices, such as, for example, throughput, bandwidth, input-output operations per second (IOPs), latency and processing speed.

The data collection and forecasting engine 120 collects the data, for example, through scheduled collections at designated times and/or through event-based collections. Scheduled collections may occur at pre-defined times or intervals specified by, for example, an administrative user via one or more user devices 102 or automatically scheduled by the data collection and forecasting engine 120. Event-based collections are triggered by one or more events such as, but necessarily limited to, component failure, a detected degradation of performance of a component, installation of new software or firmware, the occurrence of certain operations, etc. In some embodiments, an integrated Dell® remote access controller (iDRAC) causes the data collection and forecasting engine 120 to collect data from one or more servers in the server pools 160 and export the collected data to a location such as a centralized database (e.g., knowledge lake 150) on the cluster management platform 110.

Figure 4:
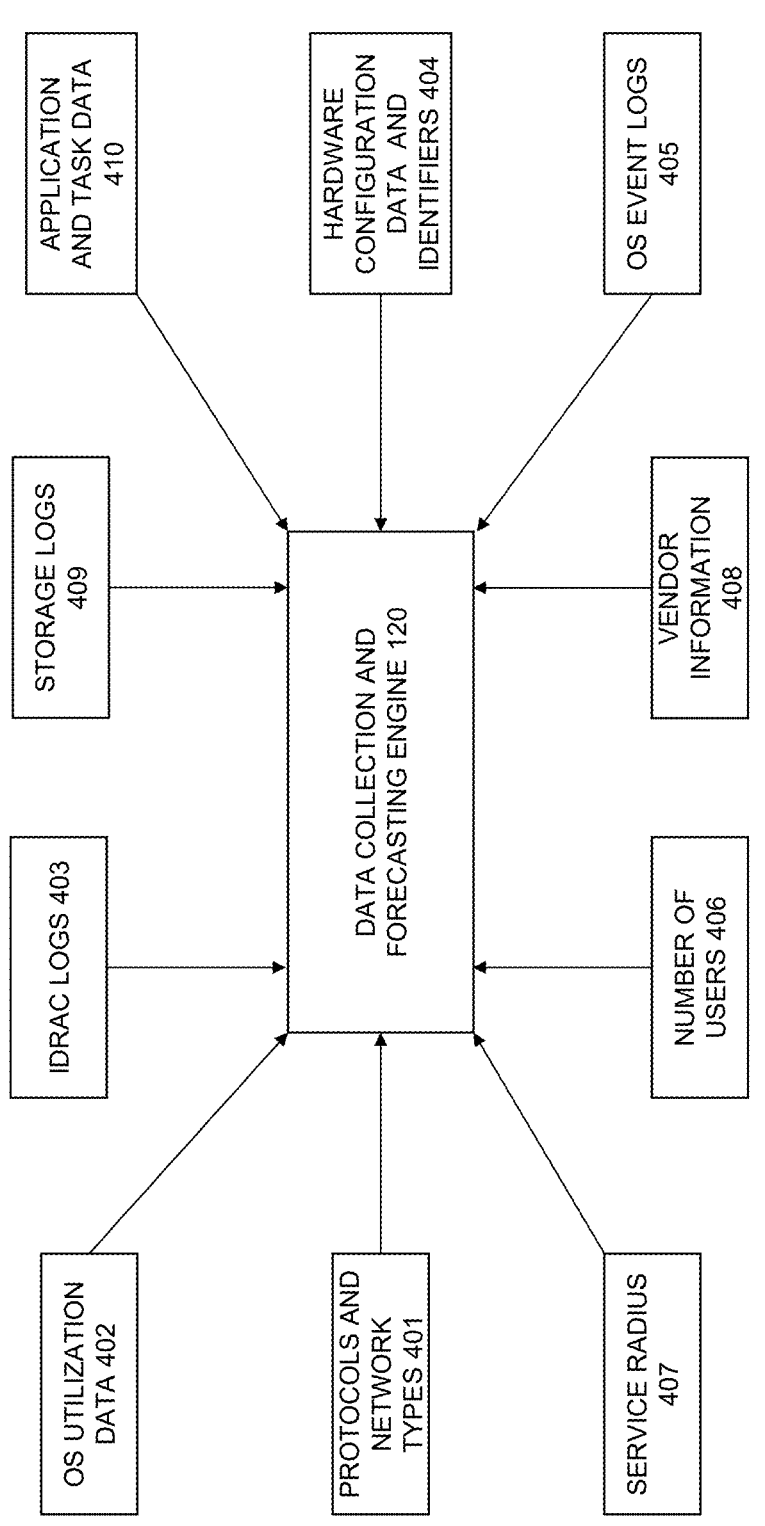
FIG. 4 depicts different types of data collected by a data collection and forecasting engine, according to an illustrative embodiment.

Referring to FIG. 4, the data collected by the data collection and forecasting engine 120 includes, but is not necessarily limited to, protocols and network types 401, OS utilization data 402, device iDRAC logs 403, hardware configuration data and identifiers 404, OS event logs 405, the number of network users 406, service radius data 407, vendor information 408, storage logs 409 and application and task data 410. The application and task data 410 includes, for example, an identification of which applications are installed on respective ones of the servers of the server pools 160, and/or an identification of which of the applications, tasks or workloads are running on the respective ones of the servers of the server pools 160.

For example, application and task data 410 comprises data corresponding to installed applications on a server or other processing device, including data identifying all of the services and tasks which are running in the system components and data identifying created datasets in the system components. According to an embodiment, applications are identified based on task.

In illustrative embodiments, in addition to the application and task data 410, the data collected by the data collection and forecasting engine 120 includes performance data comprising, for example, utilization data (e.g., OS utilization data 402), log data (e.g., from logs 403, 405 and 409), telecommunications network details (e.g., protocols and network types 401, number of network users 406, service radius data 407 and vendor information 408) and device configuration data (e.g., hardware configuration data and identifiers 404). The utilization data comprises, for example, central processing unit (CPU) utilization, memory utilization, network utilization and storage utilization of the servers of the server pools 160. In more detail, the utilization data includes, but it is not necessarily limited to, hardware capacity and availability data comprising, for example, memory usage and available free memory of system hardware components. Utilization data may identify incoming and outgoing input-output (IO) operation network or CPU processing traffic that a system and/or individual devices such as, for example, servers are handling.

In one or more embodiments, the data collected by the data collection and forecasting engine 120 is collected at the baseboard management controller (BMC) level using an OS passthrough channel between a BMC and OS to share OS information and logs with the BMC. The data can be collected and monitored periodically for decision making, and server statistics are maintained in each BBU locally across a C-RAN environment. The data is collected from each server using the passthrough channel.

In some embodiments, device configuration data is received from a remote-access controller (e.g., iDRAC) in a server configuration profile (SCP) file. SCP files are exported from one or more iDRACs, which include device information. In one or more embodiments, the data collection and forecasting engine 120 comprises a centralized log collector (CLC), which collects and stores the SCP files and logs from one or more iDRACs.

In one or more embodiments, the data collected by the data collection and forecasting engine 120 is collected using, for example, an autoregressive integrated moving average (ARIMA) time series machine learning model to maintain real-time results. The ARIMA time series machine learning model is used to forecast the data at regular time intervals and to describe the autocorrelations in the data to analyze the performance of servers in the server pools 160 (or servers 261) at regular periods. For example, referring back to FIG. 1, an ARIMA time series modeling layer 121 of the data collection and forecasting engine 120 executes the ARIMA time series machine learning model to determine real-time performance states of respective ones of the servers in one or more of the server pools 160.

Figure 7:
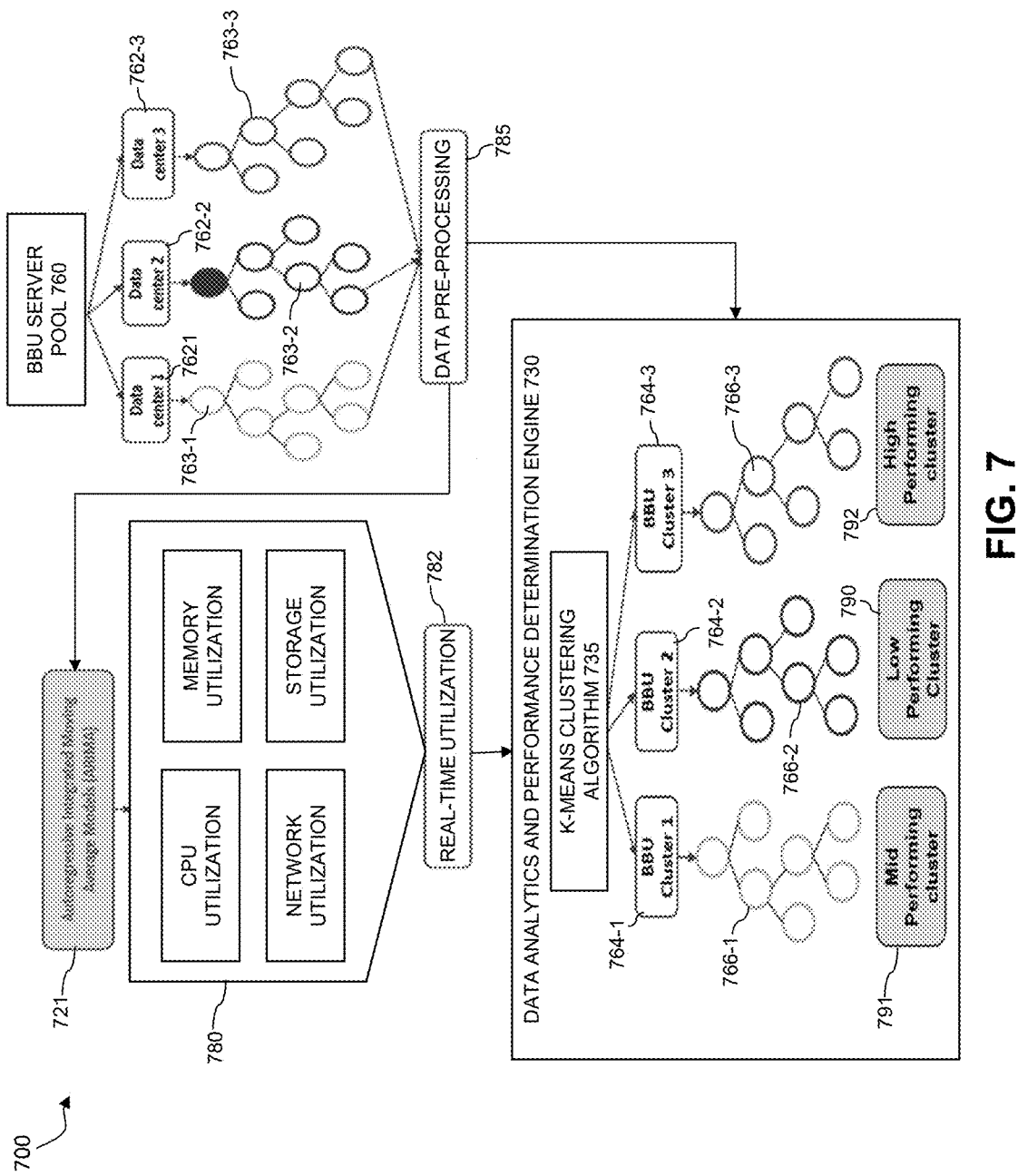
FIG. 7 depicts details of machine learning algorithms for forecasting real-time data, identifying similar data usage patterns and characteristics of a network and its users and recommending corrective actions, according to an illustrative embodiment.

In more detail, referring to the operational flow 700 in FIG. 7, data from the data collection and forecasting engine 120 including, for example, real-time utilization data 780 of the servers, is applied to one or more time series machine learning models, such as, for example, ARIMA models 721, to yield real-time system utilization states 782 of the hardware components of the servers. The real-time utilization data 780 comprises, for example, CPU utilization, memory utilization, network utilization and storage utilization of the hardware components. In some embodiments, the data collection and forecasting engine 120 continuously monitors and collects server utilization data such as, for example, CPU, memory, network, storage and power utilization, which is applied to a time series machine learning model, such as the ARIMA time series machine learning model, to analyze the data to generate the real-time system utilization states 782. FIG. 5 depicts example pseudocode 500 for forecasting server utilization based on a number of user requests a BBU can process. As can be seen in the pseudocode 500, columns are selected from a pool of fields available in the raw data. The column selected as the endogenous variable is indexed and the columns corresponding to the exogenous variables are indexed. The endogenous and exogenous variables are selected from a data frame. The data is fitted to a seasonal auto-regressive integrated moving average with exogenous factors (SARIMAX) model including ordering of the ARIMA components of the SARIMAX model. SARIMAX is a version of the ARIMA model that includes seasonal effects and exogenous factors with the autoregressive and moving average component in the model. Exogenous variables refer to external data that may be used in a forecast such as, for example, prices, temperatures, seasonal effects, etc. An endogenous variable is changed or determined by its relationship with other variables within the model.

The real-time system utilization states 782 are input to the data analytics and performance determination engine 730 (which is the same or similar to the data analytics and performance determination engine 130) for further analysis as explained in more detail herein to identify one or more BBU clusters and determine the performance of the BBU clusters. As shown in FIG. 7, a BBU server pool 760 from which the telecommunications infrastructure data is collected can include multiple data centers (e.g., data center 1 762-1, data center 2 762-2 and data center 3 7602-3 (collectively "data centers 762"). Each of the data centers include a plurality of nodes 763-1, 763-2 and 763-3 (collectively "nodes 763"). The nodes 763 include, for example, telecommunications infrastructure devices (e.g., servers (BBU servers), network switches, VMs, and other telecommunications infrastructure components). The data collection and forecasting engine 120 collects raw data from the nodes 763, which is pre-processed (data pre-processing 785) before being sent to the ARIMA models 721 and to the data analytics and performance determination engine 730. The pre-processing includes, for example, performing encoding and/or scaling of the raw data.

Referring to FIG. 1, and to the operational flow 700 in FIG. 7, data from the data collection and forecasting engine 120, including one or more of application and task data, log data, telecommunications network details, device configuration data and utilization data (e.g., the real-time system utilization states 782), is input to the knowledge lake 150 and to the data analytics and performance determination engine 130/730, which uses one or more machine learning models to determine an optimal number of clusters, identify the clusters and predict performance of the clusters.

In one or more embodiments, the data from the data collection and forecasting engine 120 is transmitted to the data analytics and performance determination engine 130/730 so that unsupervised cluster learning can be performed to form a plurality of clusters based on the input dataset. Referring to FIG. 1, the cluster number determination layer 131 optimizes the number of clusters. In more detail, a K-means clustering algorithm (e.g., K-means clustering algorithm 735 in FIG. 7), partitions the telecommunications infrastructure devices (e.g., BBU servers) into K clusters based on the similarity of the data points of the data from the data collection and forecasting engine 120. The K value is determined based on, for example, an elbow curve method, which is used to optimize the number of clusters by identifying an elbow point on one or more performance metrics. The one or more performance metrics comprise, for example, a silhouette score, sum of squared distances (SSD) and/or within-cluster sum of squares (WCSS).

WCSS techniques include computing WCSS for various values of K within a specified range. For example, given a set of data points {x1, x2, . . . , xn} and their corresponding cluster centroids {c1, c2, . . . , ck}, where K is the number of clusters, WCSS is calculated as the sum of the squared Euclidean distances between each data point and its assigned cluster centroid as in the following formula (1):

$$WCSS = \sum (i = 1 \text{ to } n) \sum (j = 1 \text{ to } k) \|xi - cj\|^2 \quad (1)$$

Here, xi represents a data point, cj represents a cluster centroid, ‖ . . . ‖ denotes the Euclidean distance, and the inner summation is taken over all the cluster centroids for each data point. The outer summation is taken over all the data points in the dataset. The goal of the K-means algorithm is to minimize the WCSS by finding the best clustering configuration with the appropriate number of clusters K.

In illustrative embodiments, a Savitzky-Golay filter is employed, which smooths the curve, permitting the identification of the rate of change and the location of the point where the rate of change is the highest. This point indicates the optimal value of K, which becomes a parameter for creating the model. The K-means algorithm uses this optimal value of K to configure the clusters, providing an effective clustering solution.

In further detail, K-means works by randomly selecting K centroids, and then assigning each data point to the nearest centroid. The centroids are then moved to the mean position of the data points in each cluster, and the process is repeated until convergence. In illustrative embodiments, cluster metrics are used to evaluate the quality of the clusters generated by the clustering algorithm. As noted herein, the metrics that may be used include silhouette score, SSD and/or WCSS. Silhouette score measures the quality of a cluster based on the distance between the data points within a cluster and the distance between the data points in the nearest neighboring cluster. A high silhouette score indicates a well-defined cluster, while a low score indicates that the data points may belong to more than one cluster. SSD measures the total distance between the data points and their respective centroids, and WCSS measures the total distance between the data points and their cluster centroids.

Based on an unsupervised cluster learning algorithm, such as K-means, in illustrative embodiments, the cluster number determination layer 131 determines the optimal number of clusters by identifying the elbow point on a performance metric, which can be supplemented by other cluster metrics. In a non-limiting example, the silhouette score, denoted as S, is a measure of the quality of clustering, ranging from −1 to 1. A higher silhouette score indicates that the samples within a cluster are like each other and dissimilar to samples in other clusters. The silhouette score is calculated for each sample in a cluster based on the average distance to other samples within the same cluster and the average distance to samples in the nearest neighboring cluster.

The data corresponding to the real-time system utilization states 782 (also referred to herein as data corresponding to performance states) is divided into a training dataset and a testing dataset. The training and testing layer 132 trains the K-means clustering algorithm using the training dataset, and tests the K-means clustering algorithm using the testing dataset.

Figure 8:
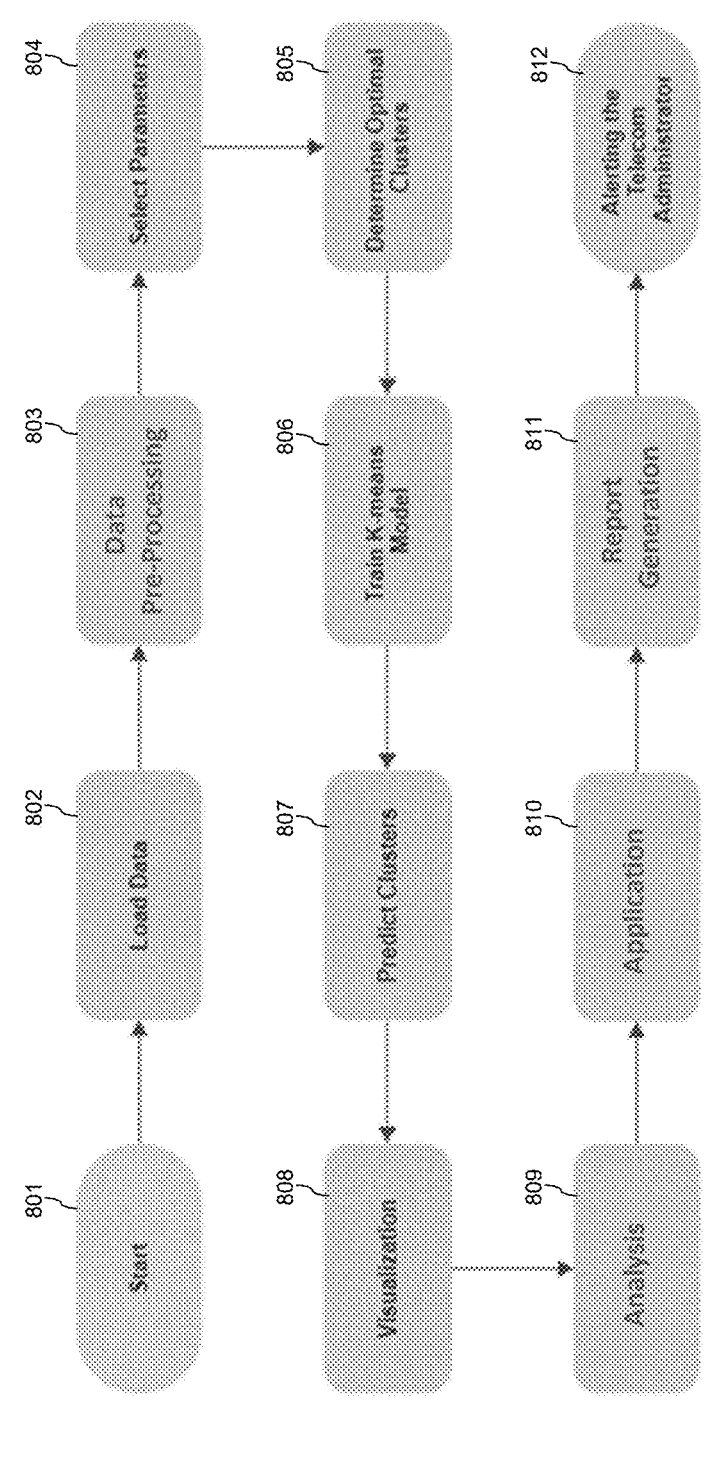
FIG. 8 depicts an operational flow for optimizing server utilization, according to an illustrative embodiment.

Referring to the operational flow 800 in FIG. 8, following a start of the operational flow (step 801), raw data from devices (e.g., servers) of a server pool 160 (e.g., BBU server pool) is collected by the data collection and forecasting engine 120 (load data 802) and is pre-processed (data pre-processing 803). As noted herein, the raw data can include, but is not necessarily limited to, a time period, a number of users of a telecommunications network, a service radius of the telecommunications network, BBU identifiers, one or more protocols of the telecommunications network, one or more types of the telecommunications network, OS information for the devices, IP addresses for the devices and disk information for the devices. The pre-processed data is processed by the ARIMA time series modeling layer 121 using a time series machine learning model (e.g., ARIMA model) to forecast performance states of respective ones of the devices. For example, the performance states (e.g., real-time system utilization states 782) include CPU utilization, memory utilization, network utilization and storage utilization of the devices. The pre-processed data and the forecasted performance state data are provided to the knowledge lake 150 and to the data analytics and performance determination engine 130/730.

Figure 3:
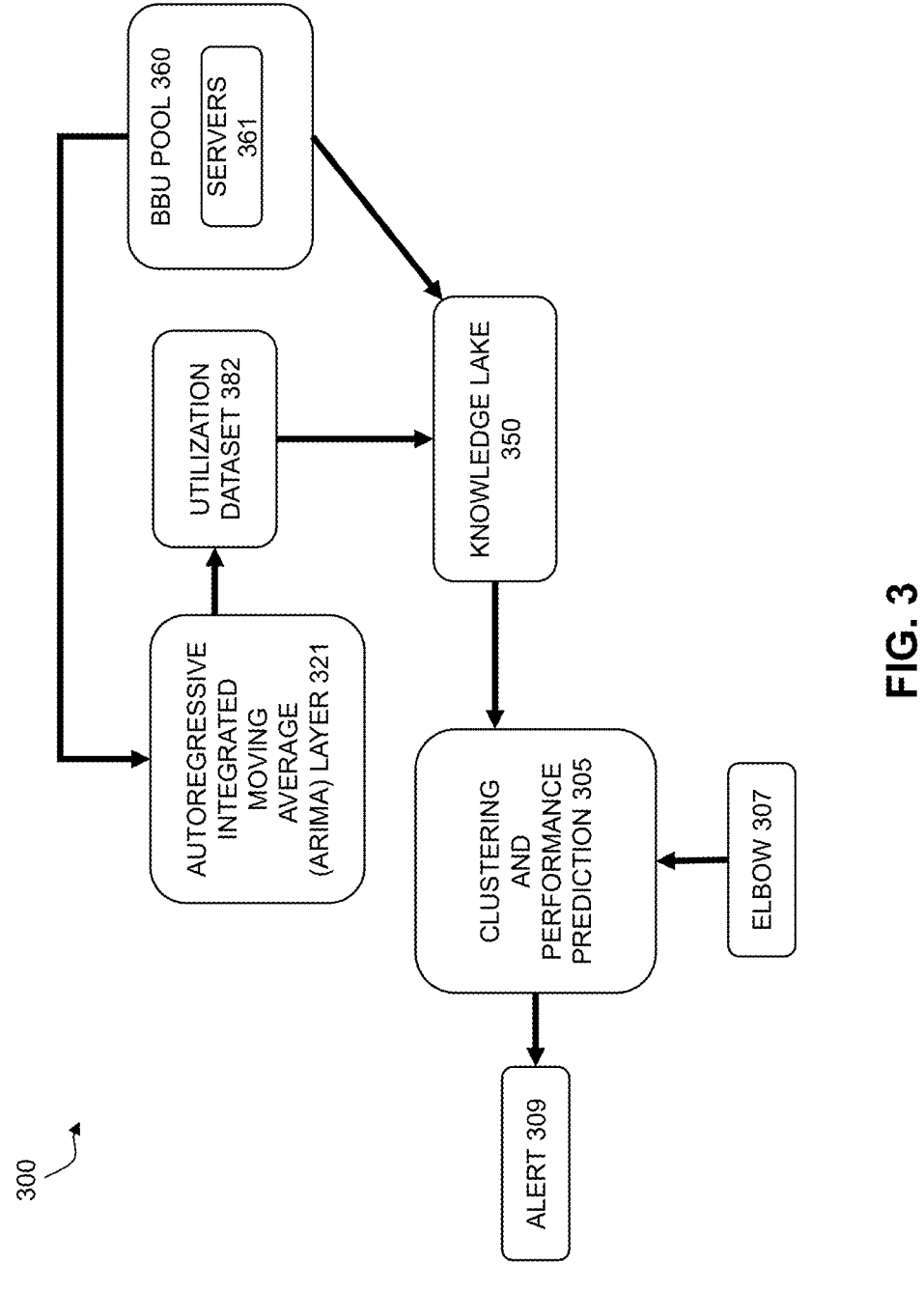
FIG. 3 depicts an operational flow for cluster management, according to an illustrative embodiment.

Similarly, referring to the operational flow 300 in FIG. 3, raw data from devices (e.g., servers 361) of a BBU pool 360 is collected by the data collection and forecasting engine 120 and is pre-processed. The pre-processed data is processed by the ARIMA time series modeling layer 321, which is the same or similar to the ARIMA time series modeling layer 121. The performance states include CPU utilization, memory utilization, network utilization and storage utilization of the servers 361 and form a utilization dataset 382. The pre-processed data and the utilization dataset are provided to the knowledge lake 350, which is the same or similar to the knowledge lake 150.

Referring back to the operational flow 800, at step 804, designated parameters (e.g., data points) to use in connection with determining the optimal number of clusters and clustering the devices (e.g., BBU servers) are selected. In an illustrative embodiment, the designated parameters include, but are not necessarily limited to, CPU utilization, memory utilization, network utilization, server utilization, bandwidth, throughput, latency and/or a number of users of at least one telecommunications network. Then, as explained herein above, the optimal number of clusters is determined using, for example, the elbow curve method (determine optimal clusters 805). The determination is based on, for example, the designated parameters and is performed using, for example, the K-means clustering algorithm. Referring to step 806, the K-means model is trained using the training dataset of the real-time utilization state data. At step 807, using the trained K-means model, clusters comprising respective subsets of the devices (e.g., BBU servers) are identified in accordance with the determined optimal number. For example, referring back to FIGS. 1 and 7, using the K-means clustering algorithm 735, the cluster identification layer 133 identifies BBU cluster 1 764-1, BBU cluster 2 764-2 and BBU cluster 3 764-3 (collectively BBU clusters 764). The BBU clusters 764 respectively include nodes 766-1, 766-2 and 766-3 (collectively "nodes 766"). In this example K=3, so the number of clusters is 3. However, the embodiments are not necessarily limited to the optimal number of clusters being 3. The nodes 766 of each BBU cluster 764 include different arrangements of BBU servers. The BBU clusters 764 are formed based on, for example, grouping together BBU servers and/or VMs of the BBU servers with similar network and/or user data usage patterns and grouping together BBU servers and/or VMs of the BBU servers associated with potentially problematic users based on their behavior and usage patterns.

Figure 6:
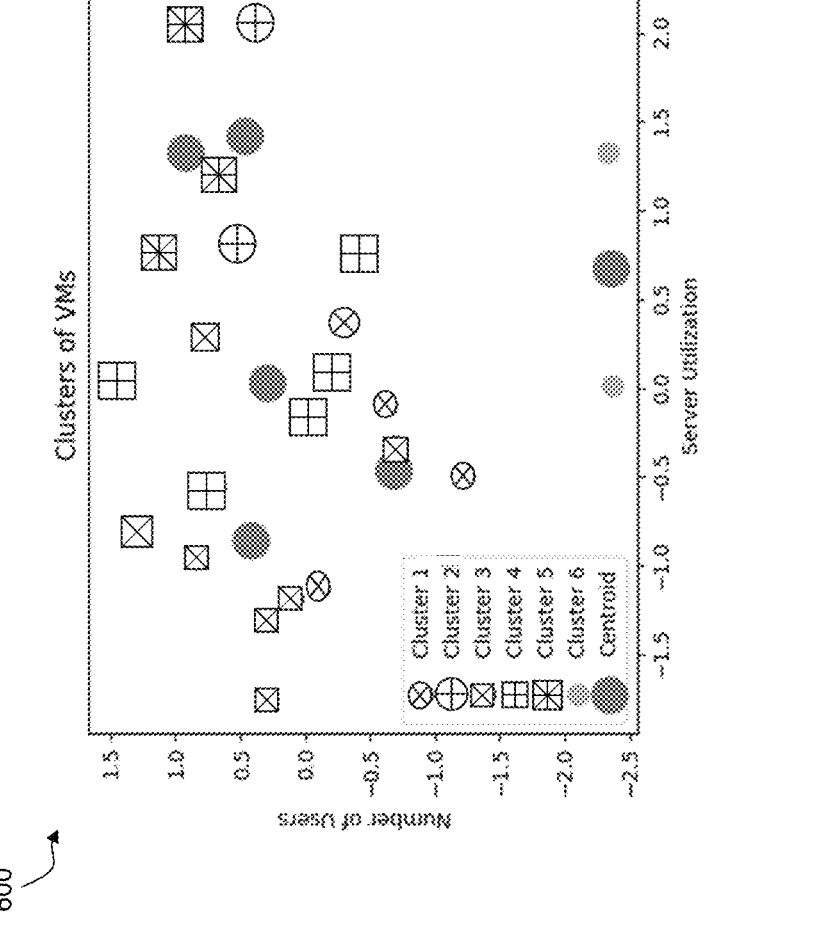
FIG. 6 depicts a plot of a number of users versus server utilization for a plurality of clusters, according to an illustrative embodiment.

The K-means clustering algorithm is further used to predict performance of respective ones of the plurality of clusters. For example, using the trained K-means clustering algorithm, the cluster analysis and visualization layer 134 predicts whether the BBU clusters 764 are low-performing, mid-performing or high-performing clusters. For example, in FIG. 7, BBU cluster 764-1 is determined to be a mid-performing cluster 791, BBU cluster 764-2 is determined to be a low-performing cluster 790 and BBU cluster 764-3 is determined to be a high-performing cluster 792. Referring to step 808 of FIG. 8, the cluster and analysis and visualization layer 134 generates one or more visualizations of the performance of respective clusters. The visualizations include, but are not necessarily limited to, plots, graphs, heat maps, charts, etc. For example, FIG. 6 depicts a generated plot 600 of a number of users versus server utilization for a plurality of clusters 1-6. In FIG. 6, the performance of clusters 1-6 is based on levels of server utilization in correspondence with a number of users. For example, relatively low server utilization for a relatively high number users can indicate a low-performing cluster. For example, cluster 3 illustrates low server utilization despite having a high number of users. As can be understood from analysis of the visualization, which can be performed by the cluster analysis and visualization layer 134 (analysis 809 in FIG. 8), with respect to cluster 3, a large number of users are making use of a system, but the servers are not being fully utilized. In applying the analysis to one or more enterprise models (application 810 in FIG. 8), this contrast between user activity and server usage could indicate potential inefficiencies or optimizations that need to be addressed in the system. Further investigation into the reasons behind this discrepancy in cluster 3 could help in identifying opportunities for better resource allocation and overall system performance enhancement.

Referring to FIGS. 1 and 8, at step 811, the report generation layer 141 of the output engine 140 generates a report including the predicted performance of the respective ones of the plurality of clusters. The report can further include the one or more visualizations and any corresponding analysis and application of the analysis to one or more enterprise models. Referring to step 812 (alerting the telecom administrator), the cluster management platform 110 causes transmission of the report to one or more user devices 102 where, for example, a user (e.g., IT administrator) can evaluate the report and make modifications to the clusters based on the results. For example, after the BBU server and/or VM clusters are placed into different performance groups (e.g., low performing, mid-performing, and high-performing) using the K-means model, an alerting system (e.g., output engine 140) can be implemented to notify a telecommunications administrator of the performance status of the BBU servers and/or VMs. The report may highlight which BBU servers and/or VMs are falling into each performance category, enabling the administrator to take proactive actions, such as troubleshooting low-performing machines, optimizing resources for mid-performing machines, and recognizing the well-performing machines. By promptly addressing performance issues and optimizing resource allocation, the telecommunications administrator can ensure optimal utilization of resources and maintain a highly efficient and reliable telecommunications infrastructure.

As can be seen in the illustrative embodiment of FIG. 3, the designated parameters are sent from the knowledge lake 350 to the data analytics and performance determination engine 130/730, where clustering and performance prediction 305 are performed. More specially, the elbow method (307) is used to determine the optimal number of clusters, the device clusters are identified, and the performance of the identified clusters is predicted. An alert 309 is generated for transmission to a user device 102 (e.g., administrator device) so that the user can address any performance issues.

According to one or more embodiments, the knowledge lake 150/350 or any other databases or data stores used by the cluster management platform 110 to store, for example, data collected and processed by the data collection and forecasting engine 120 can be configured according to a relational database management system (RDBMS) (e.g., PostgreSQL). Databases or data stores in some embodiments are implemented using one or more storage systems or devices associated with the cluster management platform 110. In some embodiments, one or more of the storage systems utilized to implement the databases or data stores comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the cluster management platform 110, the data collection and forecasting engine 120, data analytics and performance determination engine 130, output engine 140 and/or knowledge lake 150 in other embodiments can be implemented at least in part externally to the cluster management platform 110, for example, as stand-alone servers, sets of servers or other types of systems coupled to the network 104. For example, the data collection and forecasting engine 120, data analytics and performance determination engine 130, output engine 140 and/or knowledge lake 150 may be provided as cloud services accessible by the cluster management platform 110.

The data collection and forecasting engine 120, data analytics and performance determination engine 130, output engine 140 and/or knowledge lake 150 in the FIG. 1 embodiment are each assumed to be implemented using at least one processing device. Each such processing device generally comprises at least one processor and an associated memory, and implements one or more functional modules for controlling certain features of the data collection and forecasting engine 120, data analytics and performance determination engine 130, output engine 140 and/or knowledge lake 150.

At least portions of the cluster management platform 110 and the components thereof may be implemented at least in part in the form of software that is stored in memory and executed by a processor. The cluster management platform 110 and the components thereof comprise further hardware and software required for running the cluster management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection and forecasting engine 120, data analytics and performance determination engine 130, output engine 140, knowledge lake 150 and other components of the cluster management platform 110 in the present embodiment are shown as part of the cluster management platform 110, at least a portion of the data collection and forecasting engine 120, data analytics and performance determination engine 130, output engine 140, knowledge lake 150 and other components of the cluster management platform 110 in other embodiments may be implemented on one or more other processing platforms that are accessible to the cluster management platform 110 over one or more networks. Such components can each be implemented at least in part within another system element or at least in part utilizing one or more stand-alone components coupled to the network 104.

It is assumed that the cluster management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection and forecasting engine 120, data analytics and performance determination engine 130, output engine 140, knowledge lake 150 and other components of the cluster management platform 110, and the elements thereof can each be implemented in the form of one or more LXCs running on one or more VMs. Other arrangements of one or more processing devices of a processing platform can be used to implement the data collection and forecasting engine 120, data analytics and performance determination engine 130, output engine 140 and knowledge lake 150, as well as other components 35 of the cluster management platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the cluster management platform 110 to reside in different data centers. Numerous other distributed implementations of the cluster management platform 110 are possible.

Accordingly, one or each of the data collection and forecasting engine 120, data analytics and performance determination engine 130, output engine 140, knowledge lake 150 and other components of the cluster management platform 110 can each be implemented in a distributed manner so as to comprise a plurality of distributed components implemented on respective ones of a plurality of compute nodes of the cluster management platform 110.

It is to be appreciated that these and other features of illustrative embodiments are presented by way of example only, and should not be construed as limiting in any way.

Accordingly, different numbers, types and arrangements of system components such as the data collection and forecasting engine 120, data analytics and performance determination engine 130, output engine 140, knowledge lake 150 and other components of the cluster management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the cluster management platform can be offered to cloud infrastructure customers or other users as part of FaaS, CaaS and/or PaaS offerings.

The operation of the information processing system 100 will now be described in further detail with reference to the flow diagram of FIG. 9. With reference to FIG. 9, a process 900 for managing telecommunications infrastructure device clusters as shown includes steps 902 through 912, and is suitable for use in the system 100 but is more generally applicable to other types of information processing systems comprising a cluster management platform configured for managing telecommunications infrastructure device clusters.

In step 902, telecommunications infrastructure data corresponding to a plurality of devices is received. The telecommunications infrastructure data comprises at least one of a time period, a number of users of at least one telecommunications network, a service radius of the at least one telecommunications network, baseband processing unit identifiers, one or more protocols of the at least one telecommunications network, one or more types of the at least one telecommunications network, operating system information for the plurality of devices, IP addresses for the plurality of devices and disk information for the plurality of devices. The telecommunications infrastructure data may also comprise one or more performance parameters of the plurality of devices, the one or more performance parameters comprising at least one of central processing unit utilization, memory utilization, network utilization, storage utilization, throughput, bandwidth, latency and processing speed. Respective ones of the plurality of devices may comprise respective BBU servers of at least one pool of BBU servers.

In step 904, a number of a plurality of clusters comprising respective subsets of the plurality of devices is determined. The determination is based on at least a portion of the telecommunications infrastructure data and is performed using at least one machine learning algorithm. The at least one machine learning algorithm comprises a K-means clustering algorithm. The determining of the number of the plurality of clusters comprises using an elbow curve method to determine a K value for the K-means clustering algorithm.

In an illustrative embodiment, one or more parameters are selected as the portion of the telecommunications infrastructure data. The one or more parameters may comprise at least one of central processing unit utilization, memory utilization, network utilization, server utilization, bandwidth, throughput, latency and a number of users of at least one telecommunications network. The at least one machine learning algorithm can be trained based at least in part on the one or more parameters and the number of the plurality of clusters.

In step 906, the plurality of clusters are identified using the at least one machine learning algorithm. In step 908, performance of respective ones of the plurality of clusters is predicted using the at least one machine learning algorithm. In step 910, a report including the predicted performance of the respective ones of the plurality of clusters is generated. Step 912 includes causing transmission of the report to one or more user devices.

The telecommunications infrastructure data may be processed using a time series machine learning model to forecast performance states of respective ones of the plurality of devices, wherein the time series machine learning model comprises an ARIMA time series machine learning model. The performance states may identify at least one of central processing unit utilization, memory utilization, network utilization and storage utilization of the plurality of devices.

Data corresponding to the performance states can be divided into a training dataset and a testing dataset. The at least one machine learning algorithm can be trained using at least the training dataset, and can be tested using at least the testing dataset.

At least one visualization of the predicted performance of the respective ones of the plurality of clusters can be generated. The respective ones of the plurality of clusters can comprise a plurality of virtual machines.

It is to be appreciated that the FIG. 9 process and other features and functionality described above can be adapted for use with other types of information systems configured to execute cluster management services in a cluster management platform or other type of platform.

The particular processing operations and other system functionality described in conjunction with the flow diagram of FIG. 9 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a cluster management platform as disclosed herein can provide a number of significant advantages relative to conventional arrangements. For example, unlike conventional techniques, the embodiments advantageously use machine learning techniques to generate and evaluate performance of BBU device clusters based on similar data usage patterns and characteristics of a telecommunications network and its users. The embodiments advantageously perform BBU device clustering and predict the quality of service in each cluster. The clustering techniques disclosed herein facilitate optimization of resource allocation and capacity planning. By identifying groups or areas with similar resource demands, the embodiments efficiently allocate network resources and configure infrastructure upgrades.

As an additional advantage, users may also be clustered based on usage patterns, behavior, preferences and demographics. The clustering techniques disclosed herein further facilitate the assessment of service quality in different regions or for different user segments.

The embodiments provide technical solutions which collect the telecommunications infrastructure information in BMCs using a passthrough channel applicable to multiple telecommunications use cases, infrastructure planning and ensuring throughput and efficiency in a C-RAN.

Conventional techniques fail to dynamically analyze telecommunications infrastructures and predict telecommunications infrastructure device clusters. Advantageously, the embodiments use time series and K-means clustering techniques to automatically determine an optimal number of clusters, identify (define) the clusters and evaluate cluster performance. By generating visualizations of cluster performance, the embodiments provide technical solutions which offer insights into device and/or VM clusters, and apply the obtained insights to a modern software-centric enterprise model for improved resource management, infrastructure optimization, and decision-making.

As an additional advantage, the embodiments facilitate real-time collection of telecommunications infrastructure information and real-time monitoring telecommunications servers. Telecommunications infrastructure administrators are advantageously alerted in the event of a low-performing BBU in a C-RAN network. The embodiments provide functionality for using BMCs to automatically collect and evaluate performance of BBU servers when BBU servers are plugged in to a C-RAN.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the cluster management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cluster management platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
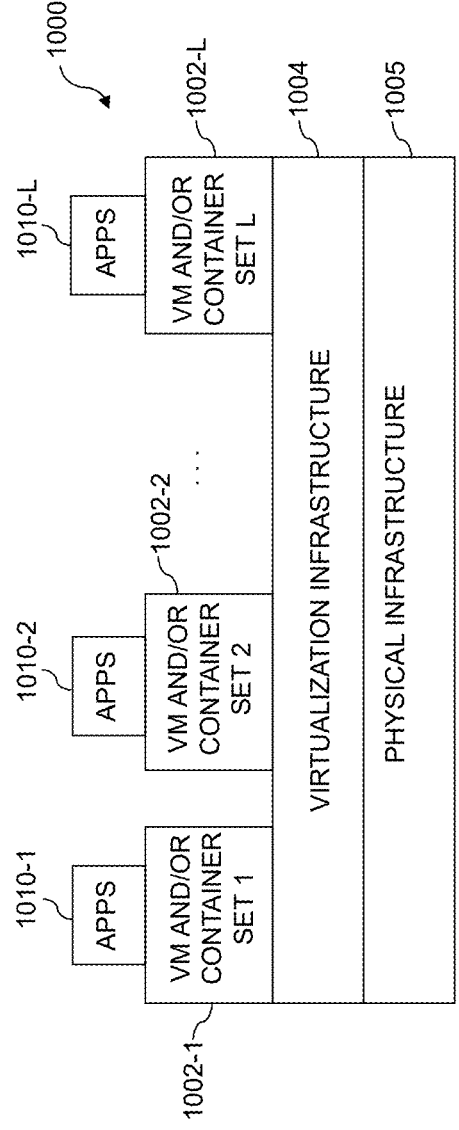
FIGS. 10 and 11 show examples of processing platforms that may be utilized to implement at least a portion of an information processing system in illustrative embodiments.
Figure 11:
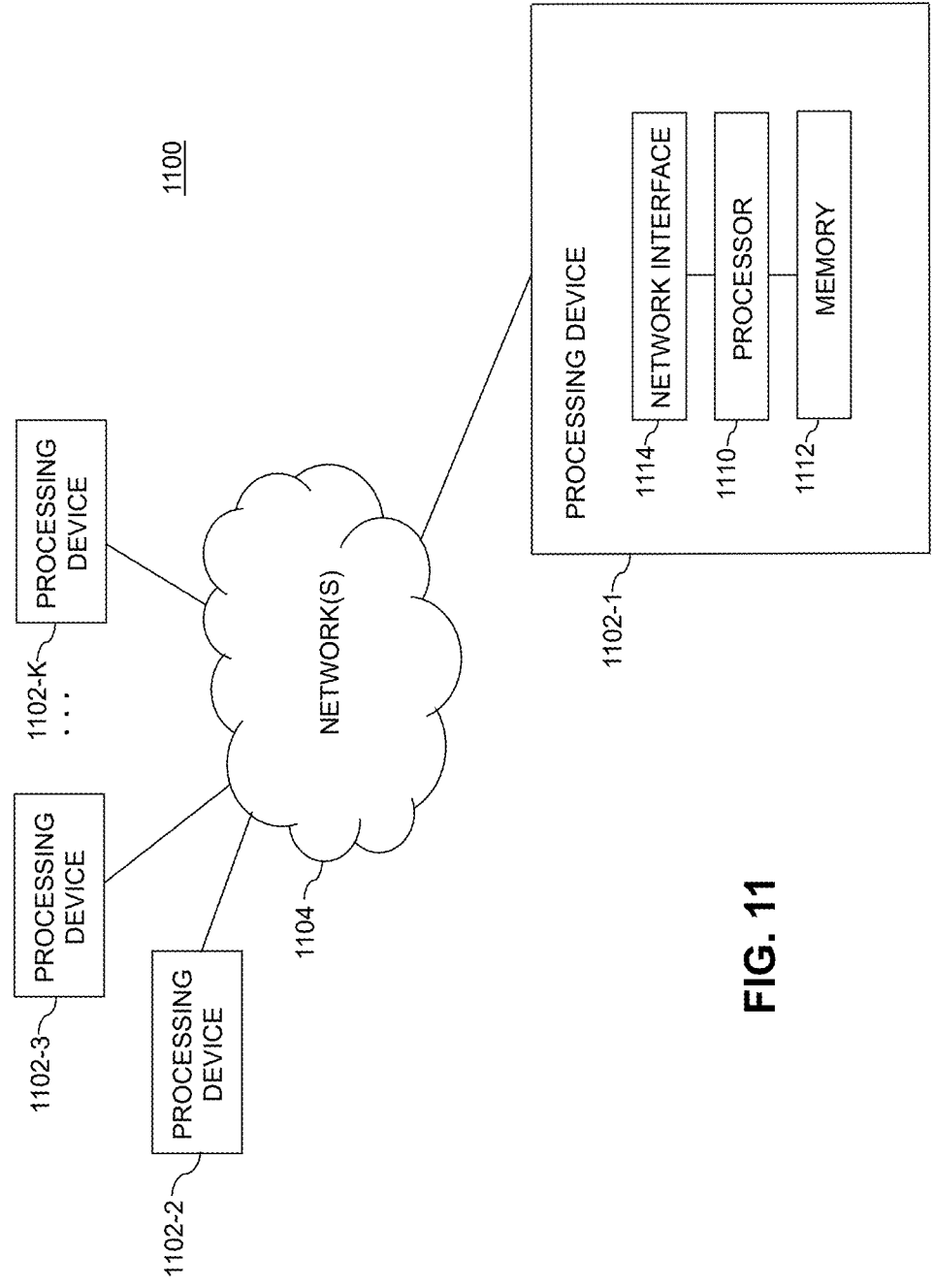

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the cluster management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and cluster management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

collecting telecommunications infrastructure data corresponding to a plurality of devices comprising baseband processing units of at least one telecommunications network, wherein the collected telecommunications infrastructure data comprises data that is indicative of current performance states of the baseband processing units;

processing the collected telecommunications infrastructure data using a time series machine learning model to determine current and future performance states of the baseband processing units;

processing at least a portion of the collected telecommunications infrastructure data and the determined current and future performance states of the baseband processing units using at least one machine learning algorithm to partition the plurality of devices comprising the baseband processing units into a plurality of clusters by:

determining a number of clusters for partitioning the plurality of devices comprising the baseband processing units, using the at least one machine learning algorithm;

identifying respective subsets of the plurality of devices comprising the baseband processing units to include in each cluster of the determined number of clusters, using the at least one machine learning algorithm; and predicting a performance of the clusters having the identified respective subsets of the plurality of devices comprising the baseband processing units, using the at least one machine learning algorithm;

generating a report including a predicted performance level and a visualization of the predicted performance of the clusters; and causing transmission of the report to one or more user devices;

wherein the steps of the method are executed by a processing device operatively coupled to a memory.

2. The method of claim 1, wherein the at least one machine learning algorithm comprises a K-means clustering algorithm.

3. The method of claim 2, wherein determining of the number of clusters for partitioning the plurality of devices comprising the baseband processing units comprises using an elbow curve method to determine a K value for the K-means clustering algorithm.

4. The method of claim 1, further comprising selecting one or more parameters as the portion of the collected telecommunications infrastructure data, wherein the one or more parameters comprise at least one of central processing unit utilization, memory utilization, network utilization, server utilization, bandwidth, throughput, latency and a number of users of the telecommunications network.

5. The method of claim 4, further comprising training the at least one machine learning algorithm based at least in part on the one or more parameters and the number of clusters.

6. The method of claim 1, wherein the telecommunications infrastructure data comprises at least one of a time period, a number of users of the at least one telecommunications network, a service radius of the at least one telecommunications network, baseband processing unit identifiers, one or more protocols of the at least one telecommunications network, one or more types of the at least one telecommunications network, operating system information for the plurality of devices, Internet Protocol addresses for the plurality of devices and disk information for the plurality of devices.

7. The method of claim 1, wherein the telecommunications infrastructure data comprises one or more performance parameters of the plurality of devices, the one or more performance parameters comprising at least one of central processing unit utilization, memory utilization, network utilization, storage utilization, throughput, bandwidth, latency and processing speed.

8. The method of claim 1, wherein the plurality of devices comprise respective baseband unit servers which comprise the baseband processing units.

9. The method of claim 1, wherein the time series machine learning model comprises an autoregressive integrated moving average time series machine learning model.

10. The method of claim 1, wherein the data that is indicative of the current performance states of the baseband processing units comprises operating parameters that identify at least one of central processing unit utilization, memory utilization, network utilization and storage utilization of the plurality of devices.

11. The method of claim 1, further comprising:

dividing data corresponding to the current performance states into a training dataset and a testing dataset;

training the at least one machine learning algorithm using at least the training dataset; and testing the at least one machine learning algorithm using at least the testing dataset.

12. The method of claim 1, further comprising generating at least one visualization of the predicted performance of the clusters.

13. The method of claim 1, wherein the clusters comprise a plurality of virtual machines.

14. An apparatus comprising:

at least one processing device that is operatively coupled to a memory, wherein the memory stores program instructions that are executed by the at least one processing device to instantiate an engine which operates to:

collect telecommunications infrastructure data corresponding to a plurality of devices comprising baseband processing units of at least one telecommunications network, wherein the collected telecommunications infrastructure data comprises data that is indicative of current performance states of the baseband processing units;

process the collected telecommunications infrastructure data using a time series machine learning model to determine current and future performance states of the baseband processing units;

process at least a portion of the collected telecommunications infrastructure data and the determined current and future performance states of the baseband processing units using at least one machine learning algorithm to partition the plurality of devices comprising the baseband processing units into a plurality of clusters by:

determining a number of clusters for partitioning the plurality of devices comprising the baseband processing units, using the at least one machine learning algorithm;

identifying respective subsets of the plurality of devices comprising the baseband processing units to include in each cluster of the determined number of clusters, using the at least one machine learning algorithm; and predicting a performance of the clusters having the identified respective subsets of the plurality of devices comprising the baseband processing units, using the at least one machine learning algorithm;

generate a report including a predicted performance level and a visualization of the predicted performance of the clusters; and cause transmission of the report to one or more user devices.

15. The apparatus of claim 14, wherein the time series machine learning model comprises an autoregressive integrated moving average time series machine learning model.

16. The apparatus of claim 14, wherein the engine further operates to:

divide data corresponding to the current performance states into a training dataset and a testing dataset;

train the at least one machine learning algorithm using at least the training dataset; and test the at least one machine learning algorithm using at least the testing dataset.

17. An article of manufacture comprising a non-transitory processor- readable storage medium having stored therein program code of one or more software programs, wherein the program code when executed by at least one processing device causes said at least one processing device to perform the steps of:

collecting telecommunications infrastructure data corresponding to a plurality of devices comprising baseband processing units of at least one telecommunications network, wherein the collected telecommunications infrastructure data comprises data that is indicative of current performance states of the baseband processing units;

processing the collected telecommunications infrastructure data using a time series machine learning model to determine current and future performance states of the baseband processing units;

processing at least a portion of the collected telecommunications infrastructure data and the determined current and future performance states of the baseband processing units using at least one machine learning algorithm to partition the plurality of devices comprising the baseband processing units into a plurality of clusters by:

determining a number of clusters for partitioning the plurality of devices comprising the baseband processing units, using the at least one machine learning algorithm;

identifying respective subsets of the plurality of devices comprising the baseband processing units to include in each cluster of the determined number of clusters, using the at least one machine learning algorithm; and predicting a performance of the clusters having the identified respective subsets of the plurality of devices comprising the baseband processing units, using the at least one machine learning algorithm;

generating a report including a predicted performance level and a visualization of the predicted performance of the clusters; and causing transmission of the report to one or more user devices.

18. The article of manufacture of claim 17, wherein the time series machine learning model performance states of respective ones of the plurality of devices comprises an autoregressive integrated moving average time series machine learning model.

19. The article of manufacture of claim 18, wherein the program code further causes said at least one processing device to perform the steps of:

dividing data corresponding to the current performance states into a training dataset and a testing dataset;

training the at least one machine learning algorithm using at least the training dataset; and testing the at least one machine learning algorithm using at least the testing dataset.

20. The article of manufacture of claim 17, where the at least a portion of the collected telecommunications infrastructure data comprises one or more parameters comprising at least one of central processing unit utilization, memory utilization, network utilization, server utilization, bandwidth, throughput, latency and a number of users of the at least one telecommunications network.

* * * * *